(12) United States Patent
Radetzki et al.

(10) Patent No.: US 11,554,706 B2
(45) Date of Patent: Jan. 17, 2023

(54) TRANSPORT TROLLEY FOR CONSIGNMENTS, AND METHOD FOR OPERATING THE TRANSPORT TROLLEY

(71) Applicants: Uwe Radetzki, Bonn (DE); Boris Trendafilov, Sankt Augustin (DE); Dong Uck Kong, Bonn (DE); Heike Bischoff, Cologne (DE); Sandra Drees, Königswinter (DE)

(72) Inventors: Uwe Radetzki, Bonn (DE); Boris Trendafilov, Sankt Augustin (DE); Dong Uck Kong, Bonn (DE); Heike Bischoff, Cologne (DE); Sandra Drees, Königswinter (DE)

(73) Assignee: Deutsche Post AG, Bonn (DE)

( * ) Notice: Subject to any disclaimer, the term of this patent is extended or adjusted under 35 U.S.C. 154(b) by 825 days.

(21) Appl. No.: 16/408,181

(22) Filed: May 9, 2019

(65) Prior Publication Data
US 2019/0344699 A1 Nov. 14, 2019

(30) Foreign Application Priority Data
May 9, 2018 (DE) .................... 10 2018 111 153.3

(51) Int. Cl.
*B60P 3/00* (2006.01)
*B60R 5/04* (2006.01)
(Continued)

(52) U.S. Cl.
CPC .............. *B60P 3/007* (2013.01); *B60R 5/045* (2013.01); *B60R 25/23* (2013.01); *B60R 25/252* (2013.01);
(Continued)

(58) Field of Classification Search
CPC ........ G05D 1/021; B65G 1/06; B62D 33/046; B62B 3/02; B60P 3/007
See application file for complete search history.

(56) References Cited

U.S. PATENT DOCUMENTS 9,713,977 B1 * 7/2017 Neal ..................... B60P 1/4442
2018/0105092 A1 * 4/2018 Putcha ..................... B60P 1/36

FOREIGN PATENT DOCUMENTS

CN 201901329 U 7/2011
CN 103832488 A 6/2014
(Continued)

*Primary Examiner* — Saul Rodriguez
*Assistant Examiner* — Willie Berry, Jr.
(74) *Attorney, Agent, or Firm* — Reinhart Boerner Van Deuren P.C.

(57) ABSTRACT

A transport trolley for consignments having wheels which define a contact plane for moving the trolley, having a load compartment for receiving consignments during transport, and having a shelf for carrying consignments. The shelf can be adjusted from a lower non-use position arranged in the load compartment into an upper, moderate use position arranged outside the load compartment, and back. The shelf can be adjusted from a lower non-use position arranged in the load compartment into an upper, elevated use position arranged outside the load compartment, and back. The moderate use position and the elevated use position are arranged in a range between 1.0 m and 1.7 m above the contact plane. The elevated use position is arranged above the moderate use position, and a drive is provided for at least partially adjusting the height of the shelf above the contact plane.

25 Claims, 9 Drawing Sheets

(51) Int. Cl.
  *B60R 25/23*    (2013.01)
  *B60R 25/25*    (2013.01)
  *B60R 25/30*    (2013.01)
  *B62D 33/04*    (2006.01)
  *G05D 1/02*     (2020.01)
  *B62B 3/02*     (2006.01)
  *B65G 1/06*     (2006.01)

(52) U.S. Cl.
  CPC .......... *B60R 25/255* (2013.01); *B60R 25/305* (2013.01); *B62B 3/02* (2013.01); *B62D 33/046* (2013.01); *B65G 1/06* (2013.01); *G05D 1/021* (2013.01); *B60R 2325/101* (2013.01); *B60R 2325/103* (2013.01); *B60R 2325/105* (2013.01)

(56) References Cited

FOREIGN PATENT DOCUMENTS

| | | |
|---|---|---|
| CN | 106080340 A | 11/2016 |
| DE | 20 2011 109787 U1 | 9/2012 |
| DE | 10 2012 205 812 A1 | 10/2013 |
| DE | 20 2014 104 729 U1 | 12/2014 |
| DE | 10 2016 106456 A1 | 10/2017 |
| DE | 10 2017 006537 A1 | 1/2018 |
| FR | 2 899 782 A1 | 10/2007 |
| WO | WO 2013/110913 A2 | 8/2013 |

\* cited by examiner

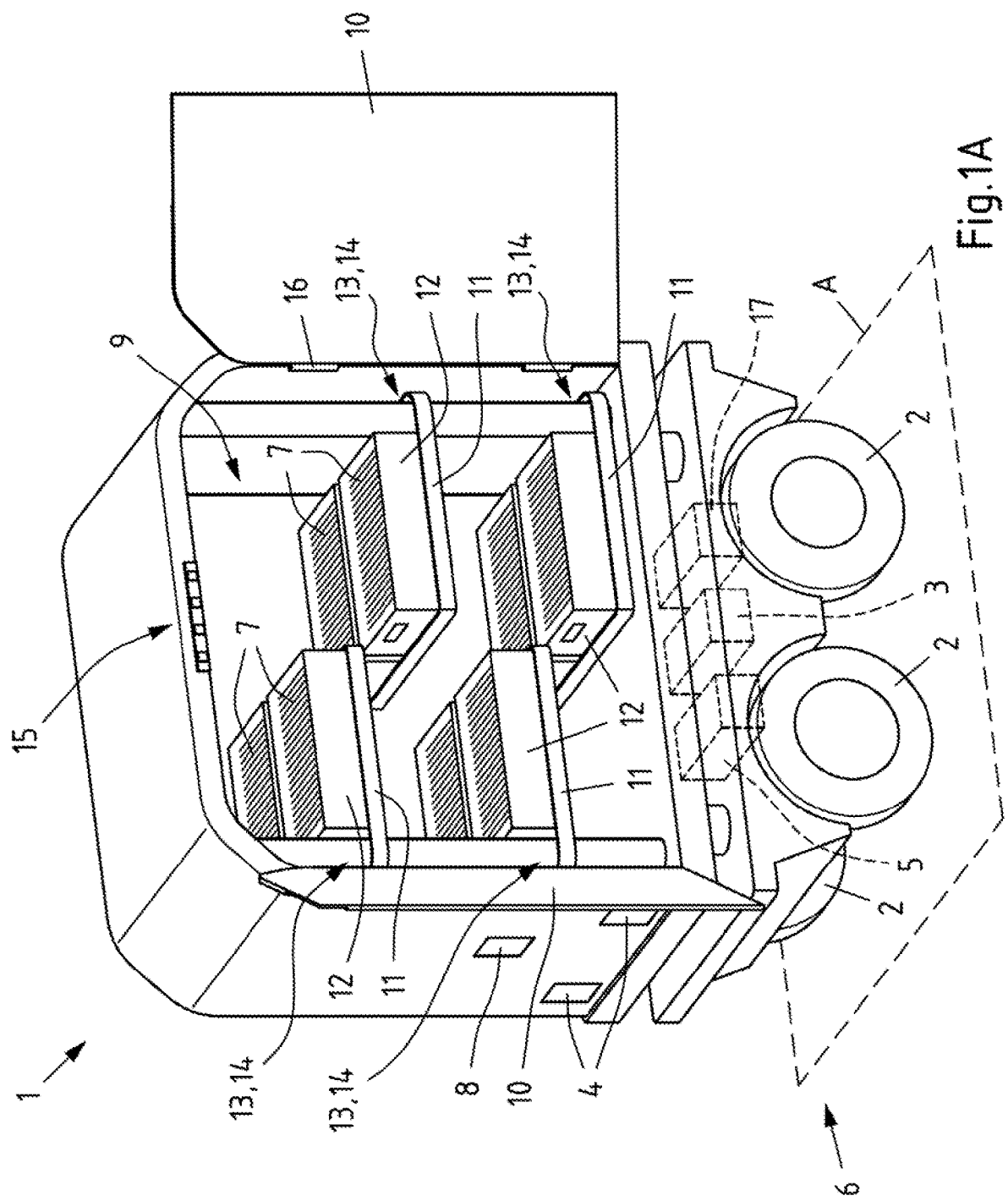

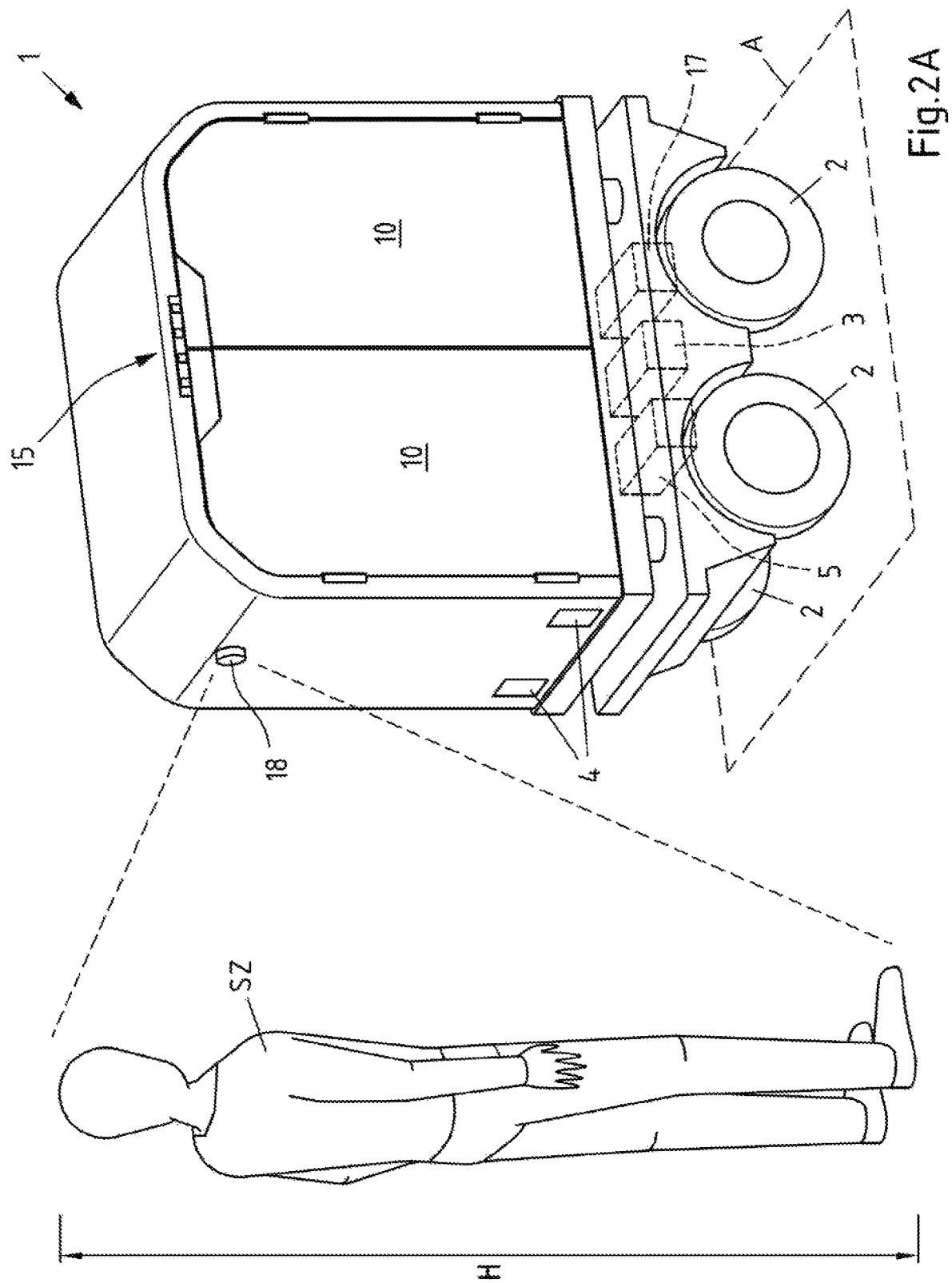

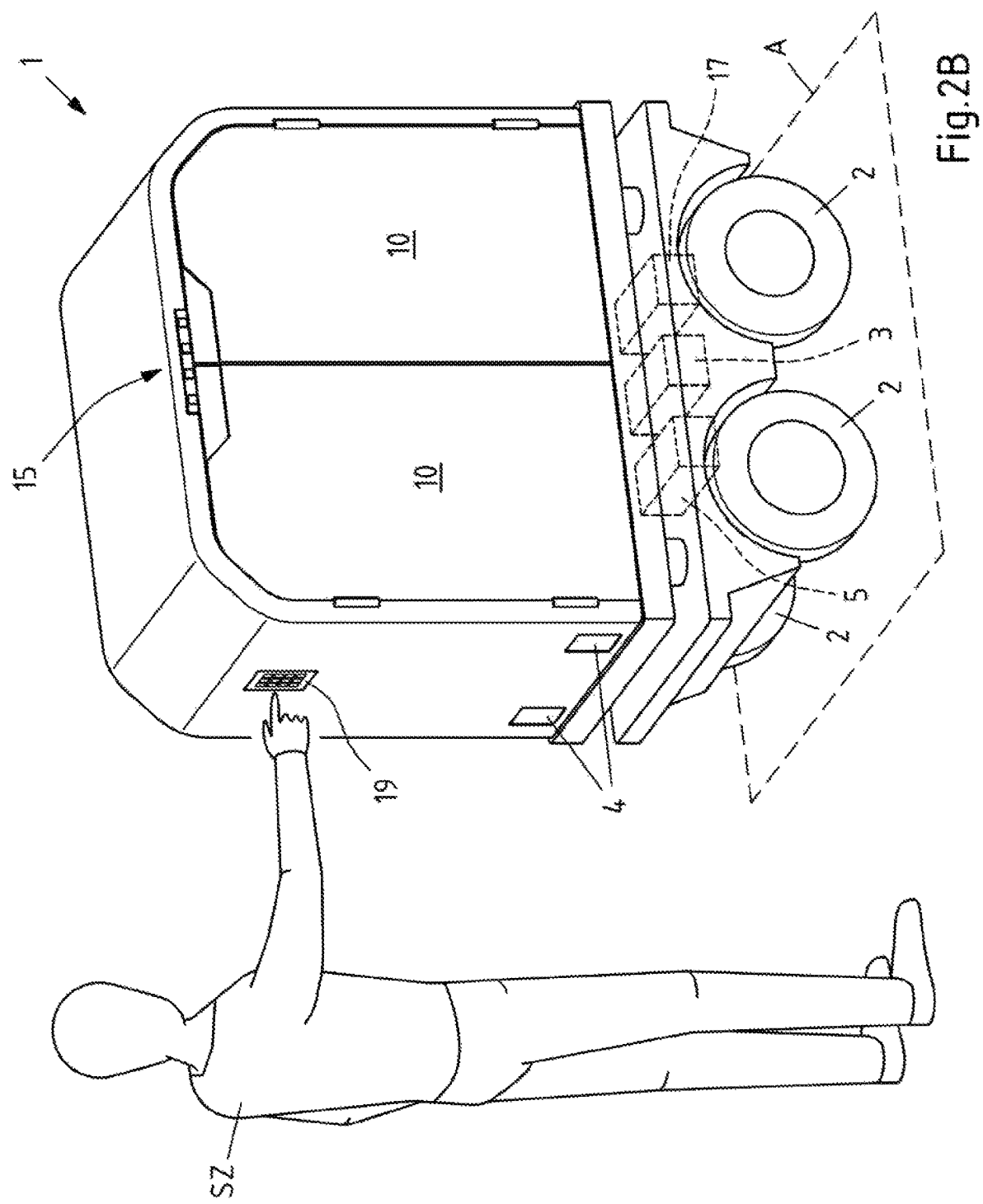

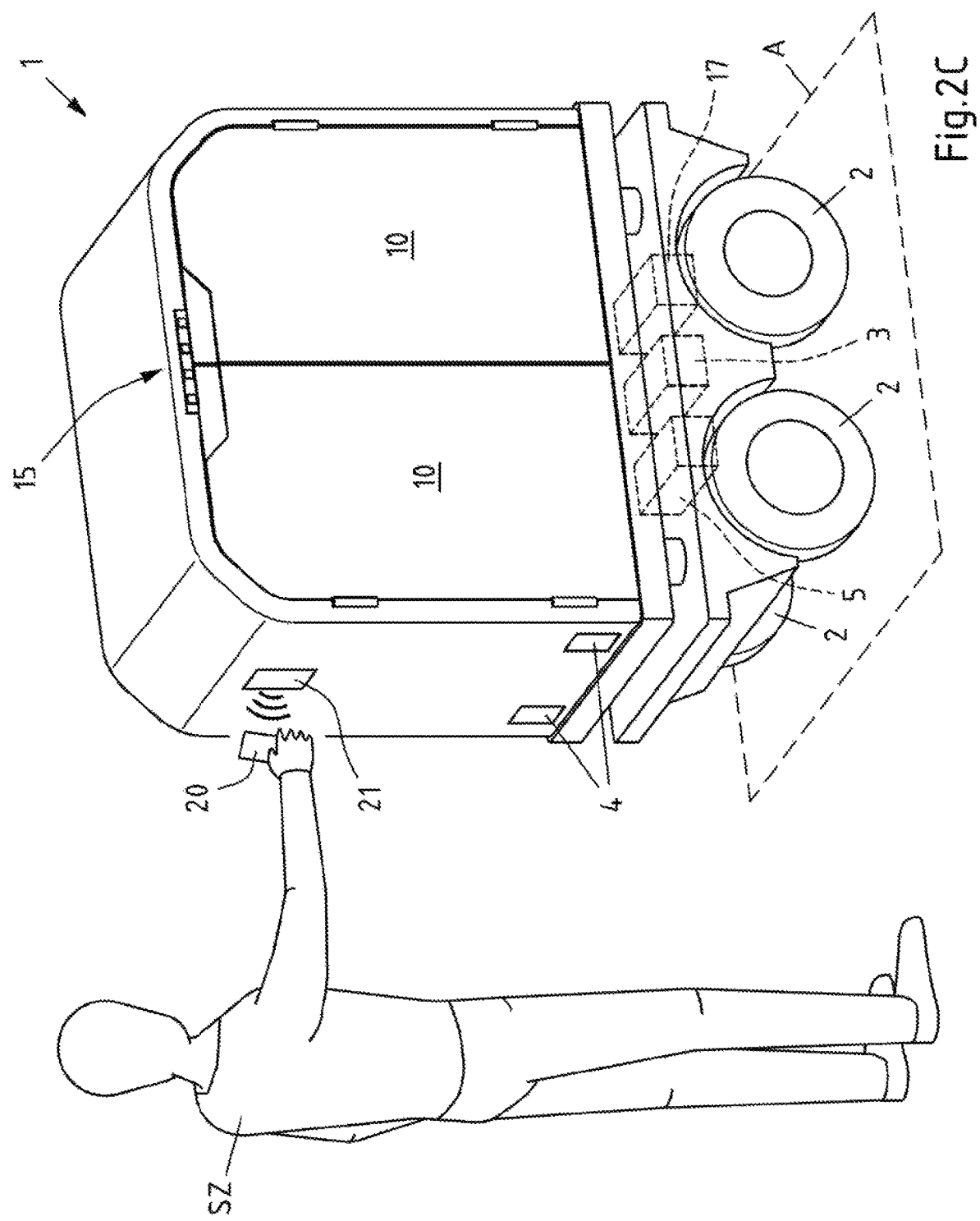

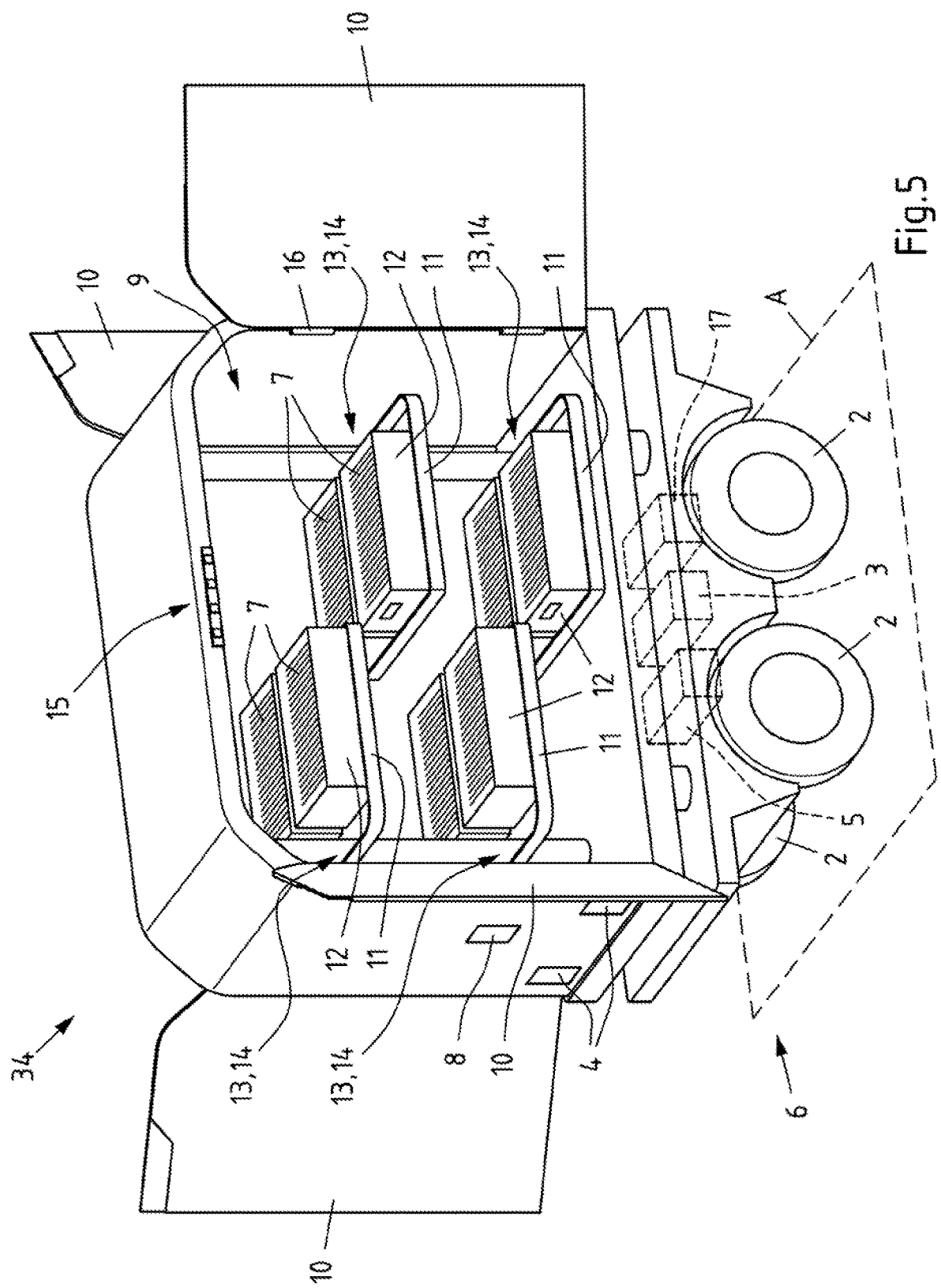

TRANSPORT TROLLEY FOR CONSIGNMENTS, AND METHOD FOR OPERATING THE TRANSPORT TROLLEY

CROSS-REFERENCE TO RELATED PATENT APPLICATION

This patent application claims priority to German Application No. 10 2018 111 153.3, filed May 9, 2018, the entire teachings and disclosure of which are incorporated herein by reference thereto.

FIELD

The invention relates to a transport trolley for consignments, having a plurality of wheels which define a contact plane for moving the transport trolley, having a load compartment for receiving the consignments during the transport, and having at least one shelf for carrying the consignments. Furthermore, the invention relates to a method for operating a transport trolley of this type.

BACKGROUND

Transport trolleys for consignments have been known in different embodiments for a long time. The transport trolleys have a load compartment, in which the consignments to be transported can be received and can be protected against external influences, such as rain or unauthorized access. In order that the consignments can be transported in a sorted state, some transport trolleys have shelves, on which the consignments can be deposited directly or in boxes. For moving the transport trolleys, they usually have four wheels. The contact points of the wheels with the underlying surface define a contact plane of the respective transport trolley, which contact plane can correspond to the underlying surface of the transport trolley but does not have to.

The consignments can be piece goods, repackaged goods, packages, letters, newspapers, magazines and/or the like. There is fundamentally no restriction with regard to the size and the weight of the consignments; in particular, consignments of the type which can be lifted, carried and handed over by one person without further aids are meant, however. This allows a person who can be a consignment deliverer to hand over, in particular deliver, the consignments which are carried in the transport trolley at defined locations which can be delivery locations. In the cases, in particular, in which the consignments are package consignments and/or letter consignments, this is as a rule called delivering and not merely handing over, even if there do not have to be any significant content-related differences here.

In the past, the transport trolleys were usually configured as hand carts which were pulled or pushed by the consignment deliverer to the delivery locations, at which the consignments which were carried were to be handed over or delivered. Said hand carts were later replaced in part by transport trolleys which had a dedicated drive. It is then no longer necessary to pull or to push the transport trolley, in order to move it from one delivery location to another delivery location. The transport trolley has to be steered, however, by a person, for instance the consignment deliverer, in order that the transport trolley which is driven by motor finds its way to the next delivery location. Transport trolleys have even been described recently which can move autonomously from one delivery location to another delivery location.

At the delivery location, the consignment deliverer has to remove the consignment which is to be handed over at the respective delivery location from the load compartment of the transport trolley, in order to hand over the consignment. This can take up a not inconsiderable amount of time, however, precisely in the case of relatively small consignments or insufficiently labeled or insufficiently identified consignments. Since the consignment deliverer is as a rule under time pressure here, the incorrect consignment can easily be removed by accident, which incorrect consignment is then handed over at a location, at which the depositing of the consignment was not intended. In addition, a plurality of consignments can be intended for depositing at the same location. Precisely in the case of relatively small consignments or insufficiently labeled or insufficiently identified consignments, it can then easily occur that the consignment deliverer accidentally does not remove all the consignments from the load compartment of the transport trolley. This then leads to incomplete handing over of consignments at a defined location.

The present invention is therefore based on the object of configuring and developing the transport trolley and the method in each case of the type which was mentioned at the outset and has previously been described in greater detail, in such a way as to accelerate the handing over of consignments and to make it more reliable.

BRIEF SUMMARY

In the case of a transport trolley in accordance with the present disclosure, said object is achieved by virtue of the fact that the at least one shelf can be adjusted from at least one lower non-use position which is arranged in the load compartment into an upper, moderate use position which is arranged at least partially outside the load compartment, and back, that the at least one shelf can be adjusted from at least one lower non-use position which is arranged in the load compartment into an upper, elevated use position which is arranged at least partially outside the load compartment, and back, that the moderate use position and the elevated use position are arranged in a range between 1.0 m and 1.7 m, in particular 1.5 m, above the contact plane, that the elevated use position is arranged above the moderate use position, and that a drive is provided for at least partially adjusting the height of the shelf above the contact plane.

Furthermore, said object is achieved in accordance with the present disclosure by way of a method for operating a transport trolley for consignments as described herein, in the case of which method the at least one shelf is adjusted from at least one lower non-use position which is arranged in the load compartment into an upper use position which is arranged at least partially outside the load compartment at a spacing of between 1.0 m and 1.7 m, in particular 1.5 m, from the contact plane.

The invention has recognized that it is laborious and unreliable if the consignments have to be picked out from the load compartment by the consignment deliverer, even if the load compartment has at least one load floor for improved sorting and for improved accessibility. In addition, it has been recognized that it is expedient to first of all adjust the at least one shelf out of a non-use position in the load compartment into a use position at least partially outside the load compartment, which use position is in addition arranged at a higher level than the non-use position. Although this represents an additional work step which apparently delays the handing over of the consignments, the consignments are then offered to the person who hands over the consignments in an ergonomically favorable position which facilitates and accelerates the picking out of the respective consignment to be handed over. This is all the more the case, since the consignment deliverer can also immediately recognize relatively small consignments, it additionally being possible for the consignment deliverer to rapidly and reliably detect even insufficient labels and/or to rapidly and reliably read insufficient markings. This leads overall to an acceleration of the handing over process with a simultaneous reduction in the susceptibility to errors.

Furthermore, the at least one shelf can be adjusted into different use positions which differ at least by virtue of the fact that the use positions are arranged at different heights with respect to the contact plane. Here, the moderate use position is situated below the elevated use position even if the moderate use position is also arranged above the non-use position which is arranged in the load compartment. Consequently, the at least one shelf is moved in each case upward out of a non-use position and partially out of the load compartment. If the shelf is arranged further to the bottom in the load compartment, a low center of gravity for stable moving of the transport trolley is provided. As an alternative or in addition, space-saving receiving of the shelf can also thus be achieved, for example below a further shelf. Since the consignment deliverer does not have to remove any consignment from the shelf in said low non-use position, the shelf can be arranged at a very low point, without making the removing of consignments more difficult or it being necessary for ergonomic disadvantages to be accepted. Here, it is particularly simple and therefore preferred if the at least one shelf can be adjusted out of one and the same non-use position both into the moderate use position and into the elevated use position. The flexibility of the transport trolley is thus also increased. The use position, into which the shelf is adjusted in each case, can be made dependent on the size of the person who has to hand over the consignments. In order that the removal of the consignments can take place very rapidly and reliably, the consignment has to be capable of being reached very simply by the corresponding person and has to be capable of being recognized very simply as the consignment to be handed over. Therefore, in the case of a relatively small consignment deliverer, the moderate use position is more effective and also more ergonomic, whereas the elevated use position is more effective and more ergonomic for a relatively tall consignment deliverer.

Against this background and the typical size of consignment deliverers, it is provided that the moderate use position and the elevated use position are arranged between 1.0 m and 1.7 m, in particular 1.5 m, above the contact plane. In this way, persons of very different height can nevertheless remove consignments from the at least one shelf and deliver them at the delivery location in a very efficient and ergonomic manner.

In order to additionally ensure that the shelf is adjusted into a suitable use position before the removal, a drive is provided which at least partially causes the adjusting. Purely manual adjusting might lead to the consignment deliverer neglecting the moving of the at least one shelf, with the result that the described advantages do not come to light. Secondly, the adjusting of the at least one shelf would then be associated with a relatively high force effort and/or handling effort, which would contribute to a further burden on the consignment deliverer in order to hand over the consignments.

For the sake of improved comprehensibility and in order to avoid unnecessary repetitions, the transport trolley and the method for operating the transport trolley will be described together in the following text, without distinguishing in each case in detail between the transport trolley and the method. A person skilled in the art can see on the basis of the context, however, which feature is particularly preferred in each case with regard to the transport trolley and the method.

In the case of a first particularly preferred refinement of the transport trolley, the at least one shelf can be adjusted from at least one lower non-use position which is arranged in the load compartment into at least three, preferably at least four, in particular at least five upper use positions which are arranged above one another and at least partially outside the load compartment, and back. In this way, the shelves can be offered at a large number of different heights to persons of very different height. Each person can then be assigned a use position which makes efficient and reliable removing of the consignments possible. It is particularly simple in method terms but also in structural terms if the shelves can be adjusted from a single or the same non-use position into the different use positions and back. It is also expedient for the consideration of usual heights of the persons for handing over the consignments if the use positions, preferably all the use positions, are arranged between 0.8 m, in particular 1.0 m, and 1.7 m, in particular 1.5 m, above the contact plane.

In order for it to be possible for the use position to be adapted particularly satisfactorily to persons of different height, it is additionally appropriate to arrange at least two, preferably at least three, in particular at least four, use positions in a range between 1.1 m and 1.6 m, preferably in a range between 1.2 m and 1.5 m, in particular between 1.3 m and 1.4 m, above the contact plane. The more use positions are arranged in a smaller height range, the more precisely and accurately the use positions can be adapted to the respective body heights of the persons for handing over the consignments. Here, in addition, the use positions are not tied to the specified height ranges. For example, four use positions can be arranged in a height range between 1.2 m and 1.5 m and at least one use position can additionally be provided at a higher and/or lower level. In addition, it is fundamentally expedient, independently of the height range, in which the use positions are arranged, if the height difference of at least one pair of use positions with respect to the contact plane is less than 10 cm, preferably less than 7 cm, in particular less than 5 cm. This permits a very precise adaptation of the use positions to the respective person for operating the transport trolley. Against this background, it is further preferred for the same reason if all the use positions which follow one another in the height direction with respect to the contact plane have a height difference of less than 10 cm, preferably less than 7 cm, in particular less than 5 cm.

In order to make space-saving receiving of the consignments in the load compartment of the transport trolley possible, at least two shelves can be arranged above one another in each case in a non-use position. Of said shelves, at least one shelf can then be capable of being adjusted from the non-use position which is arranged in the load compartment into an upper use position which is arranged at least partially outside the load compartment, and back. If required, it is expedient here, in order to reduce the structural complexity, if only one shelf or only certain ones of the shelves which are arranged above one another can be adjusted out of the non-use position into a use position. The consignments then have to be transferred as required from a non-adjustable shelf onto an adjustable shelf, which can take place simply if the consignments are received, for example, in boxes which lie on the shelves. Since the lower shelf can usually be reached less satisfactorily in the non-use position than the at least one shelf which is arranged further to the top, it is expedient if at least or only the lower shelf in the non-use positions can be adjusted from the non-use position which is arranged in the load compartment into an upper use position which is arranged at least partially outside the load compartment, and back.

Furthermore, it is expedient for the adjusting of the shelves and the handling of the consignments if the shelves are not too large. This can be achieved if at least two pairs of shelves are provided, the shelves of each pair of shelves being arranged above one another in each case in a non-use position. In other words, a plurality of shelves can thus be arranged next to one another and above one another in the load compartment of the transport trolley. There are then a plurality of groups of shelves which are arranged in each case above one another. The groups of shelves are then additionally arranged in each case next to one another. Of each group of shelves which are arranged above one another, at least one shelf, to be precise, in particular, the respective lower shelf in the non-use positions, can then preferably be adjusted from the non-use position which is arranged in the load compartment into an upper use position which is arranged at least partially outside the load compartment, and back. In this way, the structural complexity of providing all the shelves such that they can be adjusted between a non-use position and a use position therefore does not have to be implemented. If this is realized for the respective lower shelf, however, this compensates for the fact that the lower shelf can be positioned far to the bottom and therefore in a poorly accessible manner, in order to achieve space-saving receiving of the consignments in the load compartment.

In order to achieve structurally simple and at the same time flexible adjusting of the shelves, the adjusting of the height of the at least one shelf with respect to the contact area and between a position in the load compartment and a position at least partially outside the load compartment can take place in each case separately. The height adjustment can therefore take place independently of the adjusting out of the load compartment and back again. This allows the provision of two separate adjusting mechanisms. However, this does not mean that the height adjustment and the lateral adjustment in each case have to take place after one another. A superimposed adjustment is fundamentally also conceivable which contributes fundamentally to an acceleration of the adjusting.

The lateral adjusting of the shelf can be achieved simply and reliably even in the case of constricted space conditions if the at least one shelf is configured such that it can be pivoted and/or displaced linearly between a position in the load compartment and secondly a position at least partially outside the load compartment. In other words, the at least one shelf is then pivoted at least partially laterally out of the load compartment and/or is pulled at least partially laterally out of the load compartment. In the other direction, the shelf is then pivoted partially into the load compartment and/or is pushed at least partially into the load compartment. The pulling out and pushing in of the at least one shelf can be achieved easily and reliably here by way of the use of a rail system.

For at least partially adjusting the height of the at least one shelf, a drive can expediently be provided in the form of a pneumatic drive, a hydraulic drive, an electromagnetic linear drive and/or an electric motor. In this way, the height of the at least one shelf can be adjusted simply and at the same time reliably. As an alternative or in addition, at least for partially laterally adjusting the at least one shelf, a drive can be provided in the form of a pneumatic drive, a hydraulic drive, an electromagnetic linear drive and/or an electric motor. In the case of a pneumatic drive and/or a hydraulic drive, at least one pneumatic cylinder or hydraulic cylinder can be provided, into which a gas or liquid can be pressed with an increase of the cylinder volume. As required, a corresponding cylinder is provided for adjusting the shelf and/or the cylinder back into the starting position. The corresponding cylinders are then loaded in an alternating manner with gas or liquid or are filled with pressure. Depending on the configuration of the at least one cylinder, the at least one shelf can be raised or else adjusted laterally. The fundamental principle is well known, for which reason further, more detailed statements in this respect can be dispensed with. An electric motor is understood to mean a motor, in the case of which a rotor is set electromagnetically in rotation, which rotor is connected rigidly to a drive shaft. The rotation of the drive shaft can then be converted both for a height adjustment of the at least one shelf and for an adjustment of the at least one shelf toward the side. To this end, for example, a gear mechanism and/or a drive belt can be used. In the case of the linear motor, in contrast, a rotor is moved on a rectilinear or curved path which is defined by way of the stator. The magnetic fields of the rotor and the magnetic fields of the stator are combined by way of reversing the polarity of the current, in such a way that the rotor is pulled and/or pressed "forward" a little multiple times after one another. This principle is also well known, with the result that a further, more detailed description appears to be superfluous. The linear motors ultimately make a translational movement of the shelf possible in a simple way, and to be precise in order to provide a forward direction and a reverse direction, whether it is for the height adjustment or for the adjustment toward the side.

In order to cause the adjusting of the at least one shelf into a defined one of a plurality of use positions and back into at least one non-use position reliably, the use of an adjusting device is appropriate, which adjusting device causes the adjusting of the shelf into a predefined use position. Here, the adjusting device can be understood to be a control device which actuates the at least one drive in such a way that the at least one shelf is adjusted into the desired use position. The adjusting of the at least one shelf back into at least one defined non-use position can likewise be controlled by the adjusting device. Here, it is particularly expedient if the adjusting device determines a use position on the basis of person-related data and predefines said use position for the adjusting of the at least one shelf. The person-related information can be, for example, the height of the consignment deliverer. It can also be person-related information, however, which allows the adjusting device to recognize the consignment deliverer. This is sufficient, in particular, when the height or the optimum use position with respect to the respective person is stored in a data memory. The adjusting device can then constantly read out the data which are stored with respect to the corresponding person and then predefine the use position, into which at least one shelf is to be adjusted.

For inputting the person-related data or the person-related information, for example by way of the consignment deliverer himself/herself, the transport trolley can have an input device for the sake of simplicity. Said input device can comprise, for example, a keyboard, a touchpad and/or a touchscreen. A manual input of the person-related data thus becomes possible in a simple way. It is possibly desirable, however, for instance in order to avoid manipulations, that at least one sensor device is provided which detects the person-related data or person-related information, without a manual input thereof being necessary. For this purpose, the sensor device can have, for example, an optical sensor, for instance comprising a camera and/or a laser. The sensor which is, for example, optical can then directly detect the height of the consignment deliverer in a defined area next to the transport trolley, in order to adapt the use position of the at least one shelf to the corresponding body height of the corresponding consignment deliverer. The sensor which is, for example, optical can also, however, determine characteristic parameters, in particular of the face, an iris and/or a fingertip of the relevant person, in order to make a conclusion about the respective person or to identify him/her. In simple terms, the sensor device can carry out face recognition and/or can detect the iris or the fingerprint of the consignment deliverer.

As an alternative or in addition, the sensor which is, for example, optical can also be used to read out a personal identifier which has been written, for example, on a memory card or an identification card. Here, the personal identifier can be stored, for example, in the form of a barcode. The corresponding person will then, for example, approach the sensor device with the memory card or the identification card, which sensor device identifies the person on the basis of the memory card or the identification card and makes it possible for the adjusting device to read out the suitable use position of the at least one shelf. It can also be provided that the consignment deliverer plugs the memory card or the identification card into the transport trolley, in order to be read out by the sensor device. Then, for example, there can be a magnetic strip, a Radio Frequency Identification (RFID) tag or a Near Field Communication (NFC) tag on the memory card or the identification card. As an alternative or in addition, the transport trolley can also have a receiver which can receive electromagnetic signals. This allows the consignment deliverer to send the person-related information to the transport trolley. This can fundamentally take place by means of any desired radio signals, it being possible for the term "radio" to be understood very broadly. The distance which is bridged can also be very small. For example, the receiver can be configured for reading out a Radio Frequency Identification tag (RFID tag) or a Near Field Communication tag (NFC tag). Here, the Radio Frequency Identification tag (RFID tag) or the Near Field Communication tag (NFC tag) can be provided, for example, on a memory card or an identification card of the consignment deliverer. However, person-related information can also be sent to the receiver which is of corresponding configuration via a local radio network or a mobile radio network, for example Bluetooth or Wireless Local Area Network (WLAN) and/or a mobile radio network, in particular Global System for Mobile communication (GSM), Universal Mobile Telecommunications System (UMTS) and/or Long Term Evolution (LTE).

The height adjusting of the at least one shelf can be realized in a simple and space-saving manner if the at least one shelf is held in a height-adjustable manner by a telescopic rod. If the shelf is held on a segment of the telescopic rod, the height of the shelf can be changed via moving of the telescopic rod or the corresponding segment of the telescopic rod out and in again. The use of a telescopic rod additionally allows a plurality of shelves to be held on different segments of the telescopic rod and the height of said segments to be adjusted as required independently of one another. Consequently, at least two shelves can be held by different segments of the telescopic rod, which segments can be telescoped with respect to one another.

The use of a transport drive for independent moving of the transport trolley facilitates the moving of the transport trolley from one delivery location to the next delivery location. The transport trolley then does not have to be pushed or pulled by the person. In order that the consignment deliverer also does not have to actively guide or steer the transport trolley, it can be preferred, furthermore, if a sensor and control device is provided for autonomous driving of the transport trolley. The transport trolley therefore receives information about its environment, to which the transport trolley can react as required, and which allows the transport trolley to find its route. In one special refinement, the navigation complexity can be reduced by virtue of the fact that the transport trolley follows the consignment deliverer. The consignment deliverer then heads for the next delivery location in such a way as appears expedient under the given circumstances, and consequently makes the decision about the respective route. The transport trolley does not have to make said decision itself, but rather can simply follow the consignment deliverer who can have a lot of experience in the selection of the route.

In order to protect the consignments against external influences such as rain or unauthorized access, the transport trolley can have at least one door for closing the load compartment. If the at least one door is additionally coupled to the adjusting device in such a way that the adjusting device is informed about opening of the door or detects the latter, the at least one shelf can be adjusted automatically into a predefined use position by way of the opening of the at least one door. The adjusting device knows, for example, who the consignment deliverer is or into which use position the at least one shelf is to be adjusted. When the door is opened, this is the signal that a consignment is to be handed over and the shelf is to be adjusted to this end into the corresponding use position. Therefore, the at least one shelf can automatically be adjusted into a use position which is suitable for the respective person after the opening of the door.

As an alternative or in addition, at least one activating device, in particular a button, can also be coupled to the adjusting device. The coupling is then preferably such that, as a consequence of the activating of the activating device, at least one shelf is adjusted automatically into a predefined use position. Said activating device may be appropriate, for example, if the corresponding activating of the at least one shelf is not to be initiated by way of the opening of the door.

The adjusting of the at least one shelf into the use position can presuppose that at least one door is previously opened, in order to avoid a collision of the shelf and the door while the shelf is being adjusted into the use position at least partially outside the load compartment. This does not rule out, however, that adjusting of the height of the at least one shelf in the load compartment of the transport trolley can take place even in the case of a closed door. In order for it to be possible for the shelf to be moved more rapidly into the desired use position at a delivery location, the height of the shelf can already be adjusted in accordance with the use position before the opening of the door. Said initial height adjustment of the shelves in the load compartment of the transport trolley can be initiated by way of an activating device, for instance in the form of a button. The use position is also reached more rapidly when the height of a shelf is not adjusted between at least two delivery locations which follow one another, but said shelf is rather pivoted or adjusted into the load compartment and out of the load compartment again merely at the same height. In between, a door can additionally be closed as required. If the advantages outweigh the disadvantages, the adjusting of the shelf can thus take place without adjusting into the non-use position in the load compartment and back. In the case of relatively long journeys, an adjustment back into the lower non-use position will be fundamentally preferred, however. The correspondingly simplified adjusting of the shelf can be initiated in an analogous manner by way of an activating device, for instance in the form of a button.

Adjusting of the height of the at least one shelf in the load compartment, adjusting of the shelf into a use position and/or adjusting of the at least one shelf into a non-use position by way of an activating device as an alternative or in addition to the actuating of a button can also very fundamentally take place in at least one different way. The adjusting can be caused, for example, in a manner which is dependent on the position of the transport trolley, for instance on the basis of the position which is determined by the transport trolley by means of data of a satellite navigation system such as GPS (Global Positioning System), GLONASS (Global Navigation Satellite System), Galileo and/or BeiDou. It is preferably then known, at which locations the consignments are to be handed over. The activating device can also be configured, however, to detect defined gestures of the consignment deliverer, for instance by means of an optical sensor or a camera, and/or can have voice control. The consignment deliverer can initiate the corresponding adjusting in each case by way of at least one gesture or in each case by way of at least one voice command, it being possible for different adjusting operations to be initiated by way of different gestures and/or different voice commands. The activating device can also initiate the corresponding adjusting of the at least one shelf as required if the transport trolley stops or has been stopped for a defined time period. The stopping can then be detected, for example, by way of a speed measurement or monitoring of the rotation of at least one wheel. As required, it is additionally necessary for a time measurement to be able to take place after the stopping of the transport trolley. Brief stopping, for instance in order to avoid a collision with an obstacle, does not then necessarily also lead to adjusting of the at least one shelf In the case of a first particularly preferred refinement of the method for operating the transport trolley, the at least one shelf is adjusted from the use position back into the non-use position again. The transport trolley can then be moved, without there being the risk that the consignments fall down from the at least one shelf. At the next delivery location, the corresponding at least one shelf can then again be adjusted into the use position.

For the sake of simplicity, at least one drive adjusts the at least one shelf from the non-use position into the use position and/or back. The person is then relieved of said adjusting and merely has to hand over the consignments. Here, an adjusting device can preferably fix one of a plurality of use positions and can actuate the at least one drive for adjusting the at least one shelf in such a way that the at least one shelf is adjusted into the fixed use position. This ensures that the at least one shelf is adjusted into a use position at a height which is pleasant for the corresponding person.

The person can input as required at least one person-related information via an input device, in particular a keyboard, a touchpad and/or a touchscreen. Said person-related information is, for example, the height of the person, with the result that the adjusting device can select a use position at a height which is pleasant for said person. As required, the person-related information is also merely suitable, however, to identify the person. The body height or a suitable use position can then be stored in a data memory with respect to said person-related information. As a result, the adjusting device can select the suitable use position of the at least one shelf and can assign it to the corresponding person. Consequently, the adjusting device can select one of a plurality of use positions for adjusting the at least one shelf on the basis of the person-related information in accordance with predefined criteria.

The transport trolley can also determine person-related information of a person or the consignment deliverer by means of at least one sensor device, in particular by means of an optical sensor, preferably in the form of a camera and/or a laser. The sensor which is, for example, optical can then directly detect the height of the consignment deliverer in a defined area next to the transport trolley, in order to adapt the use position of the at least one shelf to the corresponding body height of the corresponding consignment deliverer. The sensor which is, for example, optical can also determine characteristic parameters, however, in particular of the face, an iris and/or a fingertip of the relevant person, in order to make a conclusion about the respective person or to identify said person. In simple terms, the sensor device can carry out face recognition and/or can detect the iris or the fingerprint of the consignment deliverer.

As an alternative or in addition, the sensor which is, for example, optical can also be used to read out a personal identifier which has been written, for example, on a memory card or an identification card. Here, the personal identifier can be stored, for example, in the form of a barcode. The corresponding person will then approach the sensor device, for example, with the memory card or the identification card, which sensor device identifies the person on the basis of the memory card or the identification card and makes it possible for the adjusting device to read out the suitable use position of the at least one shelf. It can also be provided that the consignment deliverer plugs the memory card or the identification card into the transport trolley, in order to be read out by the sensor device. Then, for example, there can be a magnetic strip, a Radio Frequency Identification (RFID) tag or a Near Field Communication (NFC) tag on the memory card or the identification card. As an alternative or in addition, the transport trolley can also have a receiver which can receive electromagnetic signals. This allows the consignment deliverer to send the person-related information to the transport trolley. This can fundamentally take place by means of any desired radio signals; it can be possible for the term "radio" to be understood very broadly. The bridged distance can also be very small. For example, the receiver can be configured to read out a Radio Frequency Identification tag (RFID tag) or a Near Field Communication tag (NFC tag). Here, the Radio Frequency Identification tag (RFID tag) or the Near Field Communication tag (NFC tag) can be provided, for example, on a memory card or an identification card of the consignment deliverer. Person-related information can also be sent to the receiver which is of corresponding configuration, however, via a local radio network or a mobile radio network, for example Bluetooth or Wireless Local Area Network (WLAN) and/or a mobile radio network, in particular Global System for Mobile communication (GSM), Universal Mobile Telecommunications System (UMTS) and/or Long Term Evolution (LTE).

The at least one shelf can be carried in a simple but effective way by a segment of a telescopic rod and can be adjusted to the height of the use position via the telescopic rod or the segment of the telescopic rod. As an alternative or in addition, the at least one shelf can be adjusted electromagnetically to the height of the use position in the form of a carriage of an electromagnetic linear drive, in particular in the form of a rod. This is possible in a reliable and space-saving manner. The at least one shelf can also be adjusted pneumatically, hydraulically and/or by electric motor to the height of the use position, however, which is very robust and inexpensive.

For the same reason, as an alternative or in addition, the at least one shelf can be moved, in particular pivoted, pneumatically, hydraulically and/or by electric motor at least partially out of the load compartment into the use position. Here, for the sake of simplicity, said movement is a lateral movement and not height adjusting. As an alternative, however, the at least one shelf can preferably additionally also be moved, in particular pivoted, pneumatically, hydraulically and/or by electric motor at least partially out of the use position into the load compartment. The abovementioned advantages are also achieved here.

In order to further relieve the consignment deliverer, the transport trolley can be moved automatically via a transport drive, which leads to a particular extent to a simplification if the transport trolley has a sensor and control device and therefore can be moved autonomously. In this case, the transport trolley can autonomously follow a consignment deliverer to the next delivery location or can accompany the consignment deliverer to there.

If the adjusting device obtains information about the opening of at least one door of the transport trolley via a door sensor, the adjusting device can as a consequence activate the at least one drive for adjusting the at least one shelf into a predefined use position, to be precise as required without needing further hand movements of the consignment deliverer to this end. The adjusting device can also receive information, however, via an activating device which is to be actuated by a person, in particular a button, as to the fact that the at least one shelf is to be adjusted into the predefined use position, and then brings about the corresponding adjusting of the at least one shelf via the at least one drive.

As an alternative or in addition, the adjusting of the at least one shelf can take place by way of an activating device in a manner which is dependent on the position of the transport trolley, for instance on the basis of the position which is determined by the transport trolley itself by means of data of a satellite navigation system such as GPS (Global Positioning System), GLONASS (Global Navigation Satellite System), Galileo and/or BeiDou. The activating device can also be configured to detect defined gestures, for instance by means of an optical sensor or a camera, and/or can have voice control. As an alternative or in addition, the activating device can also initiate the adjusting of the at least one shelf if the transport trolley stops or has been stopped for a defined time period. To this end, a speed measurement or monitoring of the rotation of at least one wheel of the transport trolley can be useful. As required, it should additionally be possible for a time measurement to be carried out after the stopping of the transport trolley.

BRIEF DESCRIPTION OF THE DRAWING

In the following text, the invention will be described in greater detail using a drawing which shows merely exemplary embodiments and in which:

FIGS. 1A-B show a first transport trolley according to the invention having a shelf in a non-use position and a use position in a perspective side view, FIGS. 2A-C show the detecting of person-related information of the consignment deliverer in diagrammatic, perspective illustrations, FIG. 5 shows a third transport trolley according to the invention in a perspective side view in accordance with FIGS. 1.

DETAILED DESCRIPTION

Figure 1B:
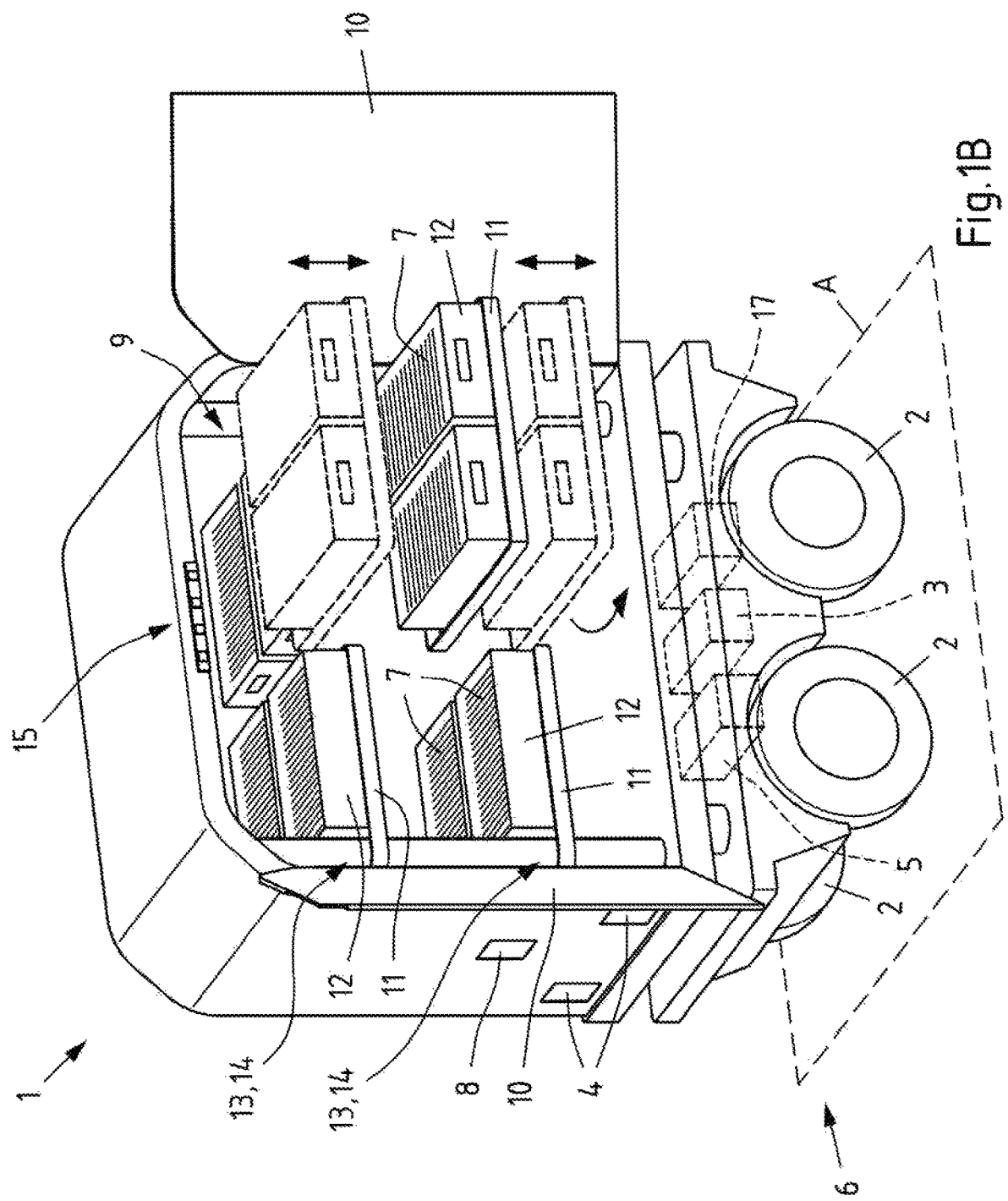

FIGS. 1A-B show a transport trolley 1 in a side view. The transport trolley 1 has four wheels 2 which stand on the underlying surface and define a contact plane A which can correspond to the underlying surface but does not have to do. The wheels 2 serve to move the transport trolley 1 which comprises a transport drive 3 for moving independently. In particular, the transport drive 3 is configured as an electric motor drive which can be supplied with power via a battery which is carried with it. The transport trolley 1 also has a series of sensors 4 which monitor the surroundings of the transport trolley 1, and a control device 5 which serves to control the transport trolley 1. The sensors 4 and the control device 5 are distributed spatially but are combined functionally in a sensor and control device 6 which allows the transport trolley 1 as required to move autonomously, that is to say without a direct intervention by way of a user.

The transport trolley 1 can therefore, for example, move to a plurality of delivery locations one after another and independently, at which delivery locations consignments 7 which are carried by the transport trolley 1 are to be handed over. The handing over can also be called delivering. The transport trolley 1 is preferably not provided, however, to hand over the consignments 7 itself at the delivery locations, but rather merely to bring the consignments 7 to the delivery locations. At the delivery locations, the consignments 7 can then be handed over by a consignment deliverer or a person who hands over the consignments 7. The consignments 7 are, for example, letter consignments, such as letters, postcards and flyers. They are inserted by the consignment deliverer, for example, into the mailboxes which belong to the corresponding addressees of the consignments 7. Since the consignment deliverer cannot be transported himself/ herself in the case of the transport trolley 1 which is shown and to this extent is preferred, the consignment deliverer and the transport trolley 1 have to pass from delivery location to delivery location. In order that the consignment deliverer and the transport trolley 1 can take the same path or the consignment deliverer can at least indirectly influence the path of the transport trolley 1, the transport trolley 1 can follow the consignment deliverer from delivery location to delivery location. The transport trolley 1 then has at least one sensor 8 which can locate the consignment deliverer. This can be an optical sensor 8 which detects the consignment deliverer on the basis of defined features.

Said at least one sensor can be attached on the transport trolley 1 at different points. In addition, different sensors 8 can be provided, for example in order that the transport trolley 1 can follow the consignment deliverer independently, such as LiDAR sensors, laser sensors, ultrasonic sensors, cameras, Radio Frequency Identification receivers, Bluetooth receivers or satellite navigation sensors, in particular GPS sensors and/or Galileo sensors.

LiDAR (Light Detection And Ranging) sensors and laser sensors can detect, for example, the consignment deliverer or his/her legs and follow him/her, from which the movement direction or the movement track for the transport trolley 1 is derived. Cameras can also detect optical features of the consignment deliverer and follow them. A location of the consignment deliverer is possible by way of Radio Frequency Identification (RFID) receivers or Bluetooth receivers. In addition or as an alternative, in contrast, satellite navigation sensors permit a positional determination and/or route determination of the transport trolley 1. In order for it to be possible for advantages of different sensors to be utilized and combined, a plurality of said sensors can also be used in parallel.

The consignments 7 are transported by the transport trolley 1 in a load compartment 9 which can be closed by way of two doors 10 in the case of the transport trolley 1 which is shown and to this extent is preferred. Another number of doors is possible, however. FIG. 1A shows the doors 10 in the open position, in order to provide a view into the load compartment 9. Four shelves 11 are accommodated in the load compartment 9, of which in each case two shelves 11 are arranged above one another. The individual pairs or groups of shelves 11 which are arranged above one another are arranged next to one another. A different number of shelves 11 can also fundamentally be provided, however, which additionally might also be arranged differently than is the case in the exemplary embodiment of FIG. 1A. In the case of the transport trolley 1 which is shown and is to this extent preferred, the shelves 11 are additionally dimensioned in such a way that in each case two boxes 12 can be deposited on them. In the present case, these are what are known as letter containers, in which a whole series of letter consignments are received behind one another.

Merely one box 12, three boxes 12 or more than three boxes 12 might also fundamentally be deposited on the shelves 11, however. Other containers than boxes 12 of the type shown might also fundamentally be suitable. In particular, containers or boxes 12 of different size can be used, in order for it to be possible for consignments 7 in the form of letters and/or consignments in the form of packages to be received depending on requirements. FIGS. 1A-B show merely one of many possible exemplary embodiments of the transport trolley 1.

The plurality of shelves 11 which are provided partially above one another make it possible to utilize the available load compartment 9 effectively, with the result that the transport trolley 1 can transport more consignments 7. In addition, the transport trolley 1 can be loaded rapidly and simply via the boxes 12, without the letter consignments getting mixed up during transport. If the load compartment 9 is loaded from top to bottom with boxes 12 which are filled with consignments 7, some of the boxes 12 are arranged a long way toward the bottom for the consignment deliverer and/or some boxes 12 are arranged a long way toward the top for the consignment deliverer. In addition, this is dependent on the body height of the consignment deliverer. This leads to it being very complicated and uncomfortable to remove the consignments 7 from the boxes 12 in the state, in which they were originally loaded.

Therefore, the two lower shelves 11 can be adjusted out of the lower (shown in FIG. 1A) non-use position which is arranged in the load compartment 9 into use positions which are arranged further toward the top and are arranged at least partially outside the load compartment 9. Said use positions are shown in FIG. 1B, one of the use positions (namely the lower use position) being shown by way of dashed lines, since the shelf 11 can be arranged in each case only in one use position at one time. In the case of the transport trolley 1 which is shown and to this extent preferred, the upper shelves 11 can also be adjusted from a lower non-use position which is arranged in the load compartment 9 into use positions which are arranged further toward the top and are arranged at least partially outside the load compartment 9. This is shown in FIG. 1B for the shelf 11 at the top right, the non-use position of said shelf 11 being shown by way of solid lines and the use position thereof being shown by way of dashed lines. A pure height adjustability of the upper shelves 11 might also be sufficient, however, or an adjustability of the upper shelves 11 might be dispensed with completely as required.

Of the two use positions of the lower shelves 11, the lower use position can be called the moderate use position and the upper use position can be called the elevated use position. In addition, further use positions might also be provided. In each of the use positions, it is simpler for a consignment deliverer to remove the consignments 7 which are to be handed over next. Firstly, the consignment deliverer does not have to bend down to such an extent. Secondly, the consignment deliverer does not have to reach into the load compartment 9 in which there is a small amount of space, in order to remove the desired consignments 7. Rather, the consignments 7 are elevated to the consignment deliverer and are presented next to the load compartment 9, with the result that the consignment deliverer can remove the consignments 7 comfortably and reliably even when they are labeled insufficiently or identified insufficiently. The degree of comfort of the removal of the consignments 7 in the individual case is greatly dependent, however, on the respective body height of the consignment deliverer.

In order to take account of the fact that the consignment deliverers who operate the transport trolley 1 after one another can possibly have very different body heights, the shelves 11 of the transport trolley 1 which is shown and is to this extent preferred can be adjusted in each case into at least two different use positions which differ substantially in that the use positions are arranged at different heights with respect to the contact area. The two use positions of the lower shelf 11 which are shown in FIG. 1B are arranged in each case at more than 1.0 m and in each case below 1.7 m, in particular 1.5 m, in order for it to be possible for the shelves 11 to be presented in each case at a suitable height for a large number of different consignment deliverers.

If two shelves 11 are arranged above one another, the upper shelf 11 cannot be adjusted, for example, in height terms, but rather merely toward the side out of the load compartment 9, or cannot be adjusted at all. Here, the upper shelf 11 can be reached comfortably even without a height adjustability in some circumstances; or the boxes 12 of the upper shelf 11 and the lower shelf 11 have to be swapped, in particular if the boxes 12 of the lower shelf 11 have been emptied. The upper shelves 11 can then transport additional boxes 12 which are used when other boxes 12 are emptied and are to be replaced with full boxes 12.

In order to further increase the comfort for the consignment deliverer, the consignment deliverer does not have to adjust the shelves 11 personally out of the non-use position into the use position which is suitable for the respective consignment deliverer. This takes place at least in part by way of a drive 13, 14 which is assigned to the shelves 11. In the case of the transport trolley 1 which is shown and is to this extent preferred, the adjusting from the non-use position as far as into the respective use position and back is caused by way of a plurality of drives 13, 14. In order to initiate the adjusting of a defined shelf 11 from the non-use position into a use position, the consignment deliverer can actuate an activating device 15 in the form of a button, the activation being enabled only when the associated door 10 is open, since the shelf 11 cannot otherwise be adjusted into the use position. In addition, each shelf 11 can be assigned a separate activating device 15 in the form of a button. If this is desired, a sensor 16 can also be installed, however, which detects if a door 10 has been moved into its open position. A signal can then be forwarded from the sensor 16, which signal activates the drive, in order to adjust the shelf 11 which is assigned to the corresponding door 10 out of the non-use position into a use position. It is then nevertheless expedient, however, if an activating device 15 in the form of a button is provided, in order to cause the adjusting of the shelf 11 out of the use position back into the non-use position by way of a corresponding activation or actuation.

It is to be taken into consideration here that the adjusting of the at least one shelf 11 into the use position as a rule requires that at least one door 10 is open, in order to avoid a collision of the shelf 11 and the door 10. This does not mean, however, that no height adjusting of the at least one shelf 11 can take place in the case of a closed door 10. Thus, for example in order to save time, the height of the shelf 11 can already be adjusted before the opening of the door 10. When the door 10 is then opened, the shelf 11 can be moved more rapidly into the desired use position. An activating device 15, for instance in the form of a button, can also be provided for said initial height adjusting of the shelves 11 in the transport trolley 1 in the case of a closed door 10.

As an alternative or in addition, it can be provided that the height of the at least one shelf 11 is not adjusted between at least two delivery locations which follow one another. The shelf 11 is then, for example, adjusted out of the use position at the same height back into the load compartment 9 of the transport trolley 1. The door 10 can then be closed. At the next delivery location, the shelf 11 can then be adjusted to the outside back into the use position. This can be expedient, in particular, when the delivery locations lie very close to one another. Very complicated adjusting of the shelf 11 is then not always necessary and can be replaced, for example, by way of simple pivoting out and in of the shelf 11. An activating device 15, for instance in the form of a button, can also be provided for causing a simplified adjustment of this type of a shelf 11.

As an alternative or in addition, the activating device 15 can cause the height adjusting of the at least one shelf 11 in the load compartment 9 and/or the adjusting of the shelf 11 into the use position and/or the non-use position in a manner which is dependent on the position of the transport trolley 1. Here, the transport trolley 1 can determine the position of the transport trolley 1, for example, independently by means of data of a satellite navigation system such as GPS (Global Positioning System), GLONASS (Global Navigation Satellite System), Galileo and/or BeiDou. This is expedient, in particular, when the locations are known, at which the consignments 7 are to be handed over. As an alternative or in addition, the activating device 15 might also fundamentally be configured to detect defined gestures, and/or might have voice control. The corresponding adjusting of the at least one shelf 11 can then be initiated by the consignment deliverer SZ by way of at least one gesture, if required corresponding gestures, and/or at least one voice command, in particular corresponding voice commands. If the transport trolley 1 detects, for example, the speed or the rotation of at least one wheel 2, the activating device 15 can detect, as an alternative or in addition, when the transport trolley 1 stops and, in this case, can cause the adjusting of the at least one shelf 11. In addition, the activating device 15 can detect the time, for which the transport trolley 1 is at a standstill, and can cause the adjusting of the at least one shelf 11 only when the transport trolley 1 has been at a standstill for a defined time period. Brief stopping of the transport trolley 1, for instance for avoiding a collision with an obstacle, does not then necessarily also lead to adjusting of the at least one shelf 11.

It might be provided that the consignment deliverer SZ selects in each case the use position, into which a defined shelf 11 is to be adjusted. This might take place, for instance, by way of the actuating of a corresponding activating device 15. For example, a separate activating device 15, in particular a separate button, might be provided for each use position of a shelf 11. This is associated with additional complexity, however, and additionally does not ensure that the consignment deliverer always selects the use position which is most favorable for him/her because it is most ergonomic. This leads to an increased burden for the consignment deliverer. Therefore, in the case of the transport trolley 1 which is shown and is to this extent preferred, an adjusting device 17 is provided which actuates the at least one drive 13, 14 in such a way that the corresponding shelf 11 is adjusted into a use position which is suitable for the consignment deliverer. The use position is therefore selected by the adjusting device 17 and not by the consignment deliverer. In order that the adjusting device 17 can select the use position which is most ergonomic for the respective consignment deliverer, the adjusting device 17 first of all has to obtain person-related information of the respective consignment deliverer.

It is particularly comfortable (as shown in FIG. 2A) if the consignment deliverer S is scanned by a scanner 18 of the transport trolley 1 before the use of the transport trolley 1, with the result that the transport trolley 1 can detect the body height of the corresponding consignment deliverer SZ. To this end, for example, the consignment deliverer SZ has to position himself/herself at a defined location next to the transport trolley 1 and has to trigger the scanning operation. When the body height H of the consignment deliverer is detected, the adjusting device 17 can select the most suitable of a plurality of use positions on the basis of said person-related information. It can also be provided as an alternative or in addition, however, that the consignment deliverer SZ himself/herself inputs the person-related data or person-related information which is required for the selection of a suitable use position.

This can take place (for example, as shown in FIG. 2B) via an input device 19 which can comprise a keyboard, a touchpad and/or a touchscreen. In order to prevent incorrect inputs, for example, a sensor device can also be provided which can detect the person-related data or information independently. An optical sensor can be used particularly expediently but not necessarily, which optical sensor can comprise a camera and/or a laser. A suitable sensor can, for example, directly detect the height of the consignment deliverer SZ in a defined area next to the transport trolley 1 or else characteristic parameters of the consignment deliverer SZ. The latter permits an identification of the consignment deliverer, whereas, in the case of the former, an identification per se is superfluous. When the consignment deliverer SZ is identified, information which belongs to the consignment deliverer SZ can be read out from a data memory, which information defines the use position, into which the at least one shelf 11 is to be adjusted. The use position can also be stored directly per se in the data memory, however. A characteristic parameter of the consignment deliverer SZ can relate to his/her face, his/her iris and/or his/her fingertip, since corresponding parameters identify the respective person reliably.

As shown in FIG. 2C, a personal identifier on a memory card 20 or an identification card can also be read out by a sensor device 21. Here, for example, barcodes may be suitable for storing and reading out person-related information. It is fundamentally independent of whether the information is read out remotely or whether the memory card 20 or the identification card has to be inserted into the transport trolley 1. The consignment deliverer SZ can also transmit the corresponding person-related information to a receiver or can have it received by a receiver. To this end, magnetic strips, Radio Frequency Identification (RFID) tags or a Near Field Communication (NFC) tag, a local radio network or a mobile radio network, for example Bluetooth or Wireless Local Area Network (WLAN) and/or a mobile radio network, in particular Global System for Mobile communication (GSM), Universal Mobile Telecommunications System (UMTS) and/or Long Term Evolution (LTE) can be used, as is well known in other contexts.

Figure 3B:
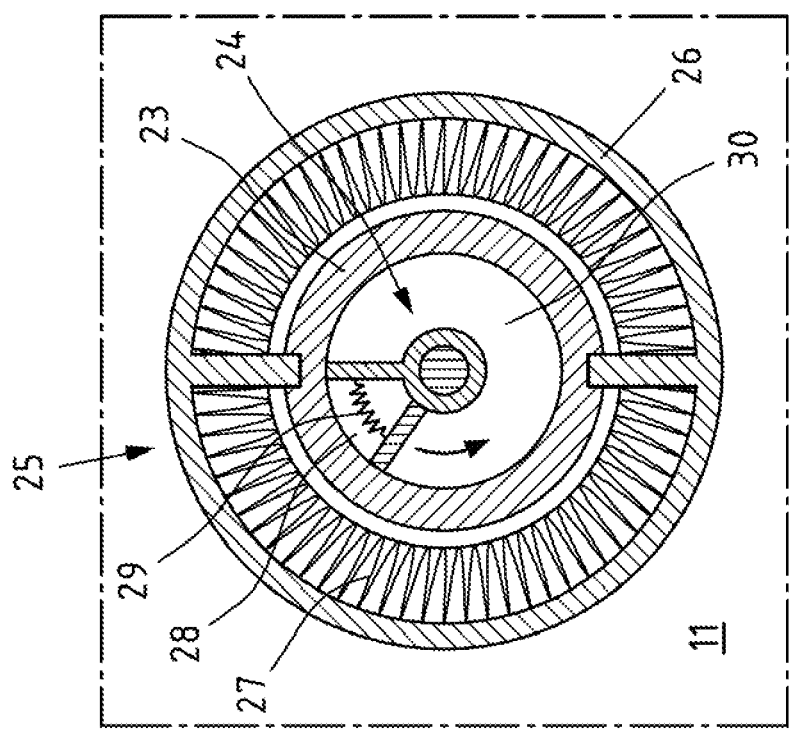
FIGS. 3A-B show a detail of the transport trolley from FIG. 1 relating to the device for adjusting the shelf in a side view and a sectional view.
Figure 3A:
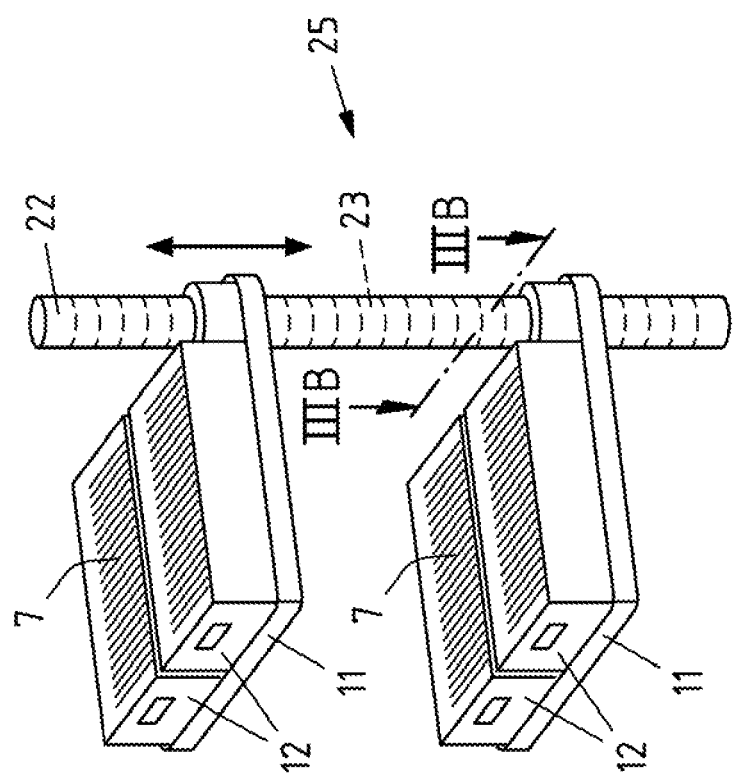

Different structural solutions may fundamentally be suitable for adjusting the at least one shelf 11 into the use positions. FIGS. 3A-B show the solution of the transport trolley 1 which is shown in FIG. 1 and is to this extent preferred. Said solution comprises a rod 22 which is equipped over its height extent with magnetic segments 23 and in the process forms the stator 24 of a linear drive 25. The shelf 11 engages around the rod 22 in the sense of a rotor 26, with a coil 27 with windings around the stator 24 which can be flowed through by current in different directions, in order to move the shelf 11 up and down along the rod 22 in a targeted manner. In this case, two or more shelves 11 can be provided and can be adjusted in a manner which is dependent on one another such that the shelves 11 do not disrupt one another. For moving of the transport trolley 1, for example, the shelves 11 can be arranged as far to the bottom as possible, in order to lower the center of gravity. If, in contrast, a shelf 11 which is not the uppermost shelf 11 of a plurality of shelves 11 which are provided on a rod is adjusted into the use position, the uppermost shelf can be adjusted toward the top to such an extent as to make it possible for a shelf 11 which lies underneath it to be adjusted into the desired use position. The shelf 11 can then firstly be lifted along the rod 22 and pivoted separately about the rod 22. This can take place, for example, pneumatically or hydraulically, by gas or liquid being pressed into a cylinder 28, with the result that the shelf 11 is pivoted. This can take place counter to a restoring force of a spring means 29, in order to pivot the shelf 11 back into the load compartment 9 again. As an alternative, however, the gas or the liquid can also be extracted from the cylinder 28. It is also conceivable that a counter-cylinder 30 is loaded with gas or liquid, in order to pivot the shelf 11 back and to displace the gas or the liquid from the other cylinder 28. If a plurality of cylinders 25 are provided above one another and along the rod 22, this results in segments 23 which can be pivoted separately, depending on the use position, into which the shelf 11 is to be pivoted, and/or the height, to which the shelf 11 has been previously lifted.

Figure 4B:
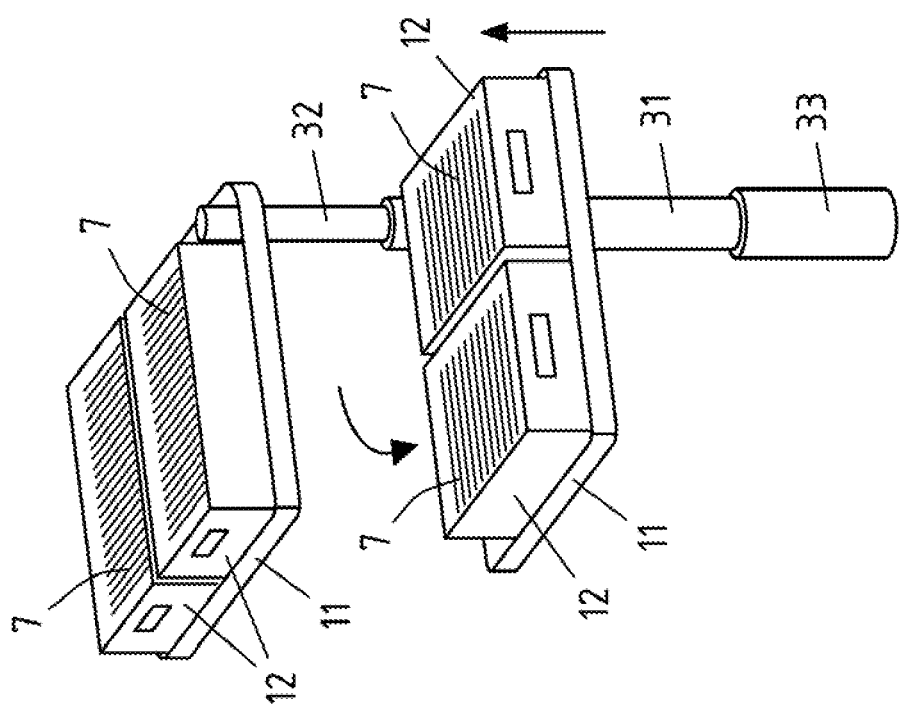
FIGS. 4A-B show a detail of a second transport trolley according to the invention relating to the device for adjusting the shelf with the shelf in a non-use position and in a use position in diagrammatic illustrations.
Figure 4A:
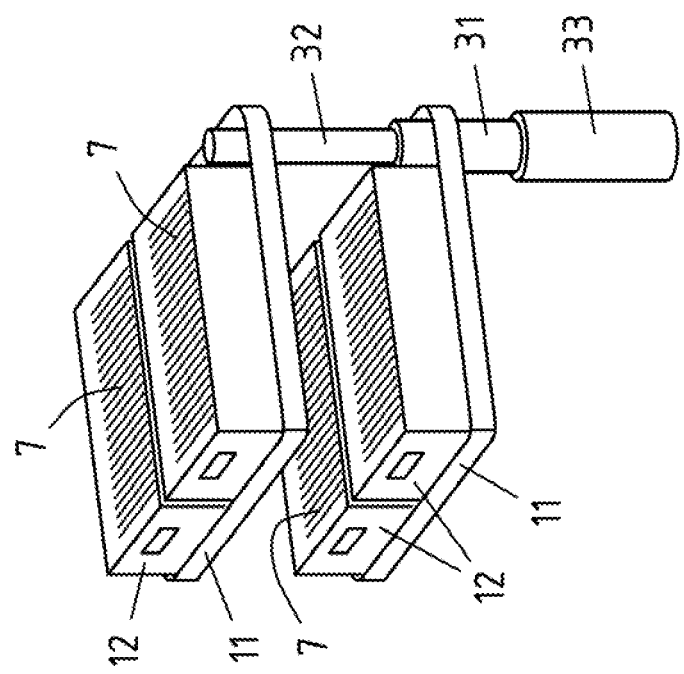

FIGS. 4A-B show an alternative adjusting possibility of the at least one shelf 11. Two shelves 11 are fixed above one another on different segments 31, 32 of a telescopic rod 33. Here, the segments 31, 32 of the telescopic rod 33 can be adjusted either independently of one another or in a manner which is at least partially dependent on one another. If required, in the case of the lifting of the lower telescopic segment 31, the upper telescopic segment 32 is also lifted, whereas the upper telescopic segment 32 can be lowered without the lower telescopic segment 31, however. Thus, for example, the upper shelf 11 can always move upward out of the way, in order that the lower shelf 11 can be adjusted into the desired use position. During the moving of the transport trolley 1, the shelves 11 can be adjusted downward as far as possible again, however, in order to provide a low center of gravity. The adjusting, in particular the pivoting, of the shelves 11 toward the side into the use position at least partially outside the load compartment takes place as required, as has already been described in conjunction with FIGS. 3A-B. Instead of the segments 23 of the stator 24, in contrast, the individual segments 31, 32 of the telescopic rod 33 can be rotated or pivoted.

FIG. 5 shows a side view of a transport trolley 34 which is very similar to the transport trolley 1 which is shown in FIGS. 1A-B, for which reason identical components are also provided with identical reference signs. In contrast to the transport trolley 1 of FIGS. 1A-B, the transport trolley 34 has doors 10 on opposite sides of the load compartment 9. In the present case, in each case two doors 10 are provided on each side of the load compartment 9, although any other number of doors would also be conceivable. Here, for example, rods 22 may also be suitable for adjusting the at least one shelf 11 into the use positions, which rods 22 are arranged differently, however, in order to make adjusting of the shelves 11 selectively possible toward the two opposite sides out of the load compartment 9. In the case of the transport trolley 34, use positions for the shelves 11 can therefore be provided on both sides of the load compartment 9. The actual adjusting of the shelves 11 possibly remains otherwise unchanged in terms of its principle, however, for example as has already been described above. In order that the shelves 11 can be moved as required out of the load compartment 9 on both sides into in each case at least one use position, the rod 22 in the case of the transport trolley 34 is arranged centrally in relation to the two sides of the load compartment 9. In addition, a greater spacing is required between the rods 22 and the associated side walls of the load compartment 9, on which side walls no doors 10 are preferably provided, in order to ensure unproblematic adjusting of the shelves 11. A deviation from a correspondingly central arrangement of the rods 22 might be made, however, if the shelves 11 of one rod 22 are provided merely for moving out of one side of the load compartment 9 and the shelves of another rod 22 are provided for moving out of the other side of the load compartment 9. Although this would possibly be structurally preferred, the flexibility with regard to the use of the transport trolley 34 would be restricted.

Figure 6:
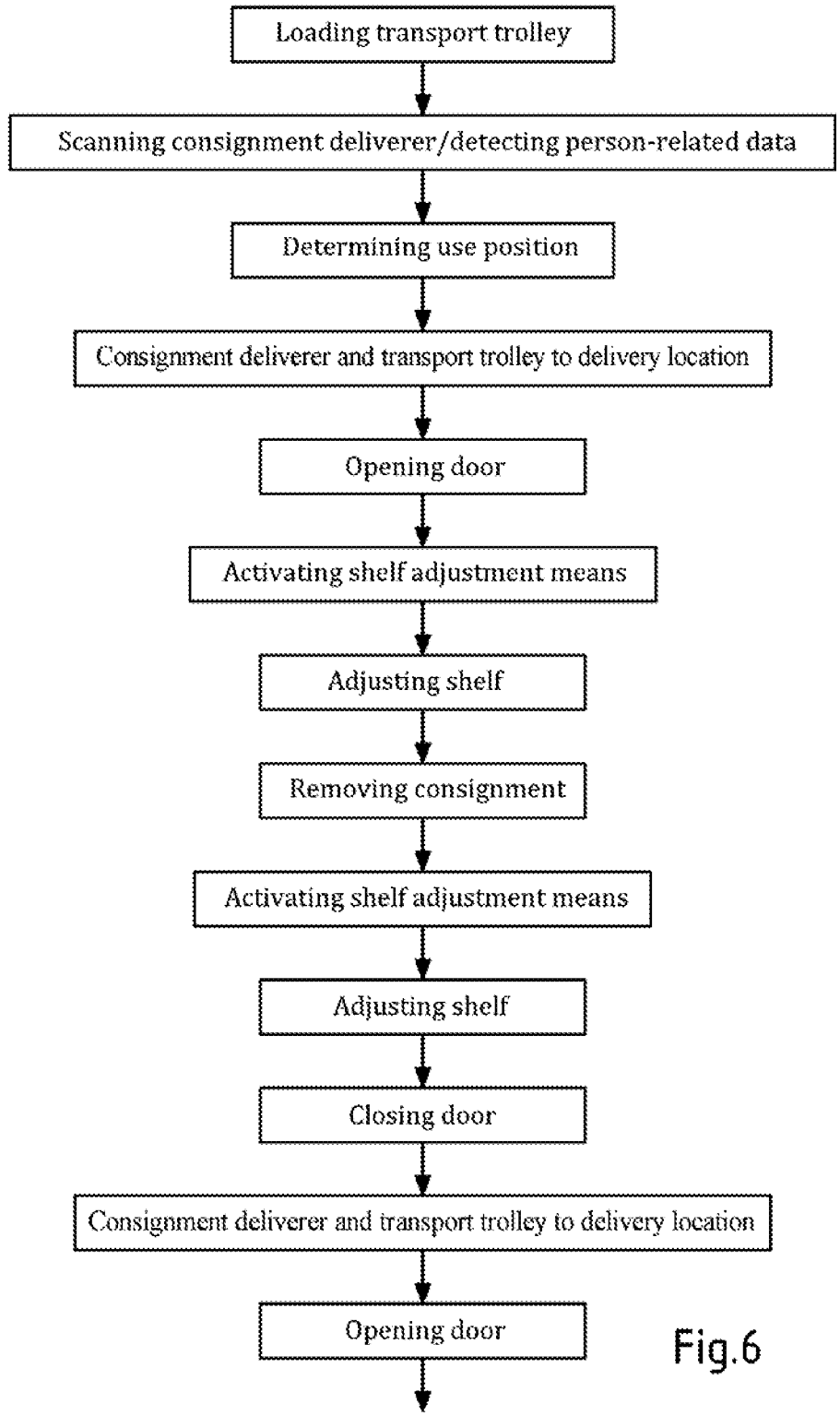
FIG. 6 shows a method according to the invention in a diagrammatic flow chart illustration.

FIG. 6 diagrammatically shows a possible method diagram. First of all, the transport trolley 1 is loaded with consignments 7. Then, either the consignment deliverer SZ for handing over the consignments 7 is scanned with a scanner, or the consignment deliverer SZ allows person-related data to be detected by a sensor or receiver. Afterward, an adjusting device 17 can determine a suitable use position for at least one shelf 11 on the basis of the height. As an alternative, the person-related information can already correspond to the desired use position, or the person-related information serves for the adjusting device 17 to read out the suitable use position from a data memory. The consignment deliverer SZ subsequently moves to a delivery location, the transport trolley 1 following the consignment deliverer SZ autonomously. On arrival at the delivery location, the consignment deliverer SZ opens a door 10 of the load compartment 9 of the transport trolley 1 and actuates an activating device 15 in the form of a button. The adjusting device 17 receives corresponding information about the activation and then actuates at least one drive for adjusting a defined shelf out of the lower non-use position which is arranged in the load compartment 9 into a defined upper use position which is arranged at least partially outside the load compartment. The consignment deliverer SZ then removes at least one consignment from the shelf 11 and hands it over at the delivery location. After the removal of the consignment, the consignment deliverer SZ actuates the activating device 15 again. Via this, the adjusting device 17 receives information and controls the at least one drive in such a way that the shelf 11 is adjusted into the non-use position again. Subsequently, the consignment deliverer SZ can close the door 10 of the load compartment 9 again and can walk to the next delivery location. Here, the transport trolley 1 follows the consignment deliverer SZ. At the next delivery location, the consignment deliverer SZ will open the door 10 again and carry out the further, above-described actions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A transport trolley for consignments, comprising:
a plurality of wheels for moving the transport trolley which define a contact plane;
a load compartment for receiving the consignments during the transport; and
at least one shelf for carrying the consignments;
wherein the at least one shelf can be adjusted from at least one lower non-use position which is arranged in the load compartment into an upper, moderate use position which is arranged at least partially outside the load compartment, and back;
wherein the at least one shelf can be adjusted from at least one lower non-use position which is arranged in the load compartment into an upper, elevated use position which is arranged at least partially outside the load compartment, and back;
wherein the moderate use position and the elevated use position are arranged in a range between 1.0 m and 1.7 m, in particular 1.5 m, above the contact plane;
wherein the elevated use position is arranged above the moderate use position;
wherein a drive is provided for at least partially adjusting the height of the shelf above the contact plane; and
wherein the at least one shelf is provided such that it can be adjusted separately in terms of the height with respect to the contact area and separately between a position in the load compartment and a position at least partially outside the load compartment.

2. The transport trolley according to claim 1, wherein the at least one shelf can be adjusted from at least one lower non-use position which is arranged in the load compartment into at least three, preferably at least four, in particular at least five upper use positions which are arranged above one another and at least partially outside the load compartment, and back.

3. The transport trolley according to claim 1, wherein at least two, preferably at least three, in particular at least four use positions are arranged in a range between 1.1 m and 1.6 m, preferably in a range between 1.2 m and 1.5 m, in particular between 1.3 m and 1.4 m, above the contact plane, and/or wherein the height difference of at least one pair of use positions with respect to the contact plane is less than 15 cm, preferably less than 12 cm, in particular less than 7 cm.

4. The transport trolley according to claim 1, wherein at least two shelves are arranged above one another in each case in a non-use position, and wherein preferably at least one shelf, in particular the lower shelf in the non-use positions, can be adjusted from the non-use position which is arranged in the load compartment into an upper use position which is arranged at least partially outside the load compartment, and back.

5. The transport trolley according to claim 1, wherein at least two pairs of shelves are provided, and wherein the shelves of each pair of shelves are arranged above one another in each case in a non-use position, and wherein preferably at least one shelf, in particular the lower shelf in the non-use positions, can be adjusted from the non-use position which is arranged in the load compartment into an upper use position which is arranged at least partially outside the load compartment, and back.

6. The transport trolley according to claim 1, wherein the at least one shelf is configured such that it can be pivoted and/or displaced linearly between a position in the load compartment and a position at least partially outside the load compartment.

7. The transport trolley according to claim 1, wherein the drive for at least partially adjusting the height of the at least one shelf is a pneumatic drive, is a hydraulic drive, is an electromagnetic linear drive and/or comprises an electric motor, and/or wherein a drive for at least partially adjusting the at least one shelf out of the load compartment and/or into the load compartment is a pneumatic drive, is a hydraulic drive, is an electromagnetic linear drive and/or comprises an electric motor.

8. The transport trolley according to claim 1, wherein an adjusting device is provided for adjusting the shelf into a predefined use position, and wherein preferably the adjusting device is provided for determining the predefined use position on the basis of person-related data.

9. The transport trolley according to claim 8, wherein an input device, in particular a keyboard, touchpad and/or a touchscreen, is provided for manually inputting the person-related data, and/or wherein at least one sensor device, in particular comprising an optical sensor, preferably a camera or a laser, and/or comprising a receiver for receiving radio signals, in particular Bluetooth, mobile radio, WLAN, RFID and/or NFC signals, is provided for determining person-related data.

10. The transport trolley according to claim 9, wherein the sensor device determines the body height of a consignment deliverer and/or determines characteristic parameters, in particular of a face, an iris and/or a fingertip, for identifying a consignment deliverer.

11. The transport trolley according to claim 8, wherein at least one door is provided for closing the load compartment, and wherein preferably the at least one door is coupled to the adjusting device in such a way that the at least one shelf is adjusted automatically into a predefined use position by way of the opening of the at least one door.

12. The transport trolley according to claim 8, wherein at least one activating device, in particular a button, is provided, and wherein the activating device is coupled to the adjusting device in such a way that at least one shelf is adjusted automatically into a predefined use position by way of the activating of the activating device.

13. The transport trolley according to claim 1, wherein a transport drive is provided for independently moving the transport trolley, and wherein preferably a sensor and control device is provided for autonomously driving the transport trolley.

14. A trasport trolley for consignments, comprising:
a plurality of wheels for moving the transport trolley which define a contact plane;
a load compartment for receiving the consignments during the transport; and
at least one shelf for carrying the consignments;
wherein the at least one shelf can be adjusted from at least one lower non-use position which is arranged in the load compartment into an upper, moderate use position which is arranged at least partially outside the load compartment, and back;
wherein the at least one shelf can be adjusted from at least one lower non-use position which is arranged in the load compartment into an upper, elevated use position which is arranged at least partially outside the load compartment, and back;
wherein the moderate use position and the elevated use position are arranged in a range between 1.0 m and 1.7 m, in particular 1.5 m, above the contact plane;
wherein the elevated use position is arranged above the moderate use position;
wherein a drive is provided for at least partially adjusting the height of the shelf above the contact plane; and
wherein the at least one shelf is held in a height-adjustable manner by a telescopic rod, and wherein preferably at least two shelves are held by different segments of the telescopic rod, which segments can be telescoped with respect to one another.

15. A method for operating a transport trolley for consignments according to claim 1, comprising the step of:
adjusting the at least one shelf from at least one lower non-use position which is arranged in the load compartment into an upper use position which is arranged at least partially outside the load compartment, at a spacing of between 1.0 m and 1.7 m, in particular 1.5 m, from the contact plane.

16. The method according to claim 15, further comprising the step of adjusting the at least one shelf from the use position back into the non-use position again.

17. The method according to claim 15, wherein the adjusting of the at least one shelf from the non-use position into the use position and/or back is caused via at least one drive, and
in the case of which method preferably an adjusting device defines one of a plurality of use positions and actuates the at least one drive for adjusting the at least one shelf into the defined use position.

18. The method according to claim 17, further comprising the steps of:
obtaining via the adjusting device information about opening at least one door via a door sensor and, as a consequence, activating the at least one drive for adjusting the at least one shelf into a predefined use position, and/or
obtaining with the adjusting device information via an activating device, in particular a button, which is to be actuated by a consignment deliverer about the fact that the at least one shelf is to be adjusted into a use position, and brings this about via the at least one drive.

19. The method according to claim 15, further comprising the steps of:
inputting at least one person-related information by a consignment deliverer via an input device, in particular a keyboard, a touchpad and/or a touchscreen, and selecting with an adjusting device one of a plurality of use positions for adjusting the at least one shelf on the basis of the person-related information in accordance with predefined criteria.

20. The method according to claim 15, further comprising the steps of:
determining with at least one sensor device person-related information, in particular by means of an optical sensor, preferably in the form of a camera and/or a laser, and/or by means of a receiver for receiving radio signals, in particular via Bluetooth, mobile radio, WLAN, RFID and/or NFC, and
selecting with an adjusting device one of a plurality of use positions for adjusting the at least one shelf on the basis of the person-related information in accordance with predefined criteria.

21. The method according to claim 20, further comprising the step of determining with the sensor device the body height of a consignment deliverer, and/or determining characteristic parameters, in particular of a face, an iris and/or a fingertip, for identifying a consignment deliverer.

22. The method according to claim 15, further comprising the steps of:
  carrying and adjusting the at least one shelf by a segment of a telescopic rod to the height of the use position via the telescopic rod, and/or
  wherein the at least one shelf in the form of a rotor of an electromagnetic linear drive, in particular in the form of a rod, is adjusted electromagnetically to the height of the use position and/or
  in the case of which method the at least one shelf is adjusted to the height of the use position pneumatically, hydraulically and/or by electric motor.

23. The method according to claim 15,
  in the case of which method the at least one shelf is moved, in particular pivoted, pneumatically, hydraulically and/or by electric motor at least partially out of the load compartment into the use position, and/or in the case of which method the at least one shelf is moved, in particular pivoted, pneumatically, hydraulically and/or by electric motor at least partially out of the use position into the load compartment.

24. The method according to claim 15,
  in the case of which method the transport trolley is moved independently via a transport drive, and
  in the case of which method the transport trolley is moved autonomously via a sensor and control device.

25. The method according to claim 24,
  in the case of which method the transport trolley autonomously accompanies a consignment deliverer to the delivery location, and/or
  in the case of which method the transport trolley autonomously follows a consignment deliverer to the delivery location.

* * * * *